(12) United States Patent
Liu et al.

(10) Patent No.: US 8,208,365 B2
(45) Date of Patent: *Jun. 26, 2012

(54) DRM RECEIVER WITH ANALOG AND DIGITAL SEPARATION FILTER AND DEMODULATION METHOD

(75) Inventors: Yan Liu, Shen Zhen (CN); Huazhong Yang, Peking (CN)

(73) Assignee: Shenzhen STS Microelectronics Co. Ltd., Shenzhen (CN)

( * ) Notice: Subject to any disclaimer, the term of this patent is extended or adjusted under 35 U.S.C. 154(b) by 456 days.

This patent is subject to a terminal disclaimer.

(21) Appl. No.: 12/079,927

(22) Filed: Mar. 28, 2008

(65) Prior Publication Data

US 2008/0279090 A1    Nov. 13, 2008

(30) Foreign Application Priority Data

Mar. 29, 2007  (CN) .......................... 2007 1 0089048

(51) Int. Cl.
*H04J 11/00* (2006.01)
(52) U.S. Cl. ......... 370/210; 370/204; 370/206; 370/208
(58) Field of Classification Search .................. 370/210, 370/204, 206, 208
See application file for complete search history.

(56) References Cited

U.S. PATENT DOCUMENTS

2003/0227985 A1* 12/2003 Schill et al. .................... 375/340
2004/0152418 A1*  8/2004 Sinha et al. ..................... 455/42
2005/0262419 A1* 11/2005 Becker et al. ................. 714/758

FOREIGN PATENT DOCUMENTS

EP              1575232 A1 *  9/2005

* cited by examiner

*Primary Examiner* — Kibrom T Hailu

(57) ABSTRACT

A Digital Radio Mondiale (DRM) receiver and demodulation method includes an analog and digital separation filter for filtering and separating a DRM-encoded signal and a non DRM-encoded signal from a composite RF signal received at the receiver. The DRM receiver includes a programmable downsampler and a programmable N-point Fast Fourier Transform (FFT) to recover and demodulate the OFDM symbols in a received DRM-encoded RF signal. The received signal is digitally sampled at a rate operably integer downsampled to achieve a number N samples in the useful portion of the OFDM symbol for input to an N-point FFT, where N equal to a power of two. The downsampling rate and size (N-points) of the FFT depend on the DRM encoding and transmission parameters, notably the robustness mode and spectrum occupancy. The structure and operation of the receiver in this manner simplifies the design and reduces the required filter order of the analog and digital separation filter.

20 Claims, 1 Drawing Sheet

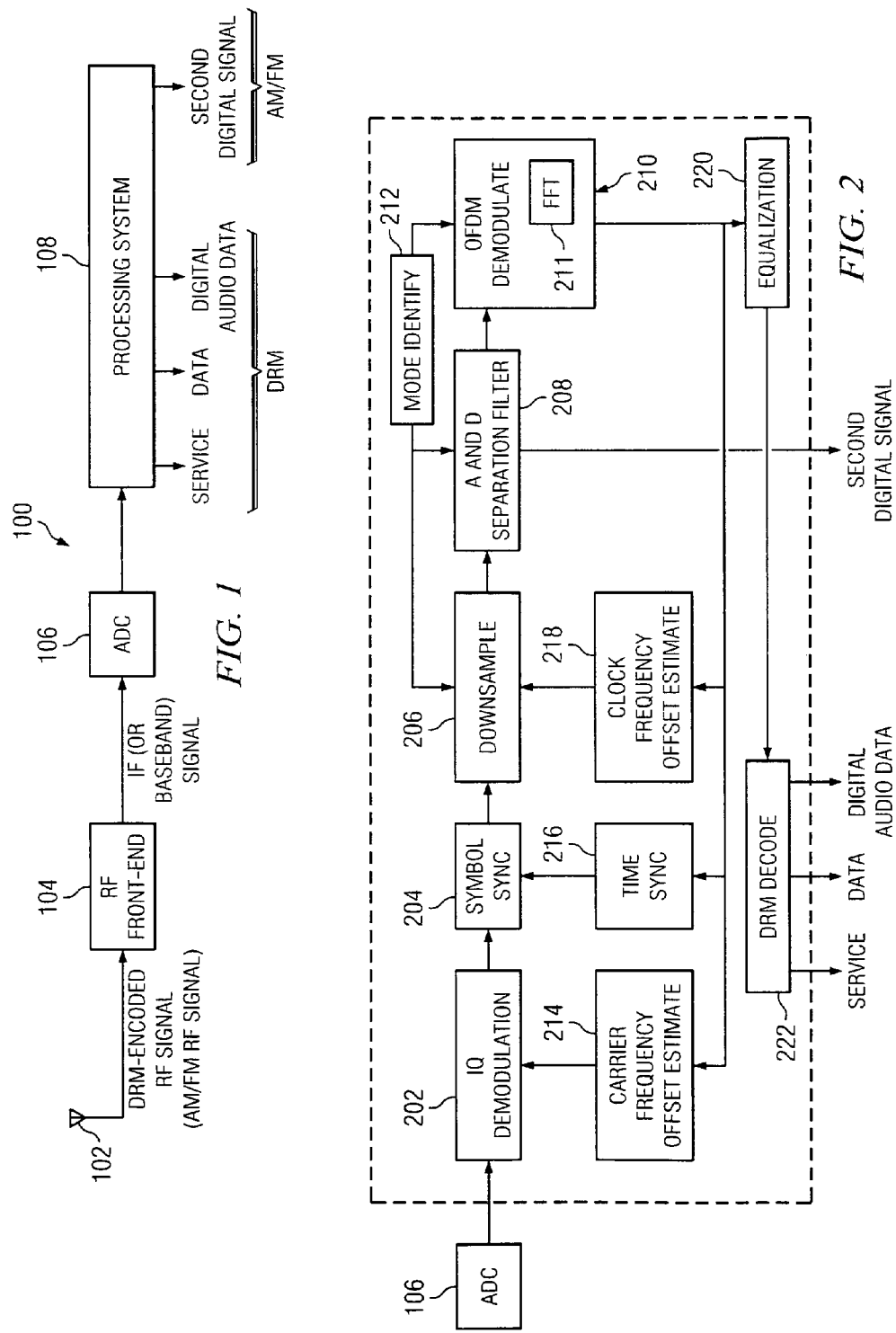

DRM RECEIVER WITH ANALOG AND DIGITAL SEPARATION FILTER AND DEMODULATION METHOD

CROSS-REFERENCE TO RELATED APPLICATION AND CLAIM OF PRIORITY

The present application claims the benefit under 35 U.S.C. §119(a) of a Chinese Patent Application filed in the Chinese Intellectual Property Office on Mar. 29, 2007 and assigned Serial No. 2007-10089048.4, the entire disclosure of which is hereby incorporated by reference.

FIELD OF THE INVENTION

The present invention relates generally to communication receivers, and more particularly, to a method and receiver for use in digital radio receiver systems.

BACKGROUND

Digital Radio Mondiale (DRM) is an open standard digital radio system designed for low frequency (148.5 KHz to 283.5 KHz), medium frequency (525 KHz to 1705 KHz) and high frequency (2.3 MHz to 27 MHz) signals, and may even be extended up to the 120 MHz range. The DRM system specification is described in European Telecommunication Standards Institute (ETSI) ES 201 980 Version 2.2.1 (2005-10), and which is incorporated herein by reference.

DRM signals are designed to fit within the existing amplitude modulation (AM) broadcast channels and spacing plan (based on 9 or 10 KHz spacing/bandwidth), however, the audio quality of DRM signals (near FM-quality) is significantly better than current AM radio system signals. Video, audio and other data may be transmitted within the DRM system. The current DRM specification provides for operation in accordance with various bandwidth modes, including 4.5, 5, 9, 10, 18 or 20 KHz, sometimes referred to as the "spectrum occupancy." In addition, DRM signals may be broadcast simultaneously with AM signals in a simulcast mode.

The DRM system uses Orthogonal Frequency Division Multiplexing (OFDM), which includes the transmission of many narrow channels in parallel sub-carriers. Within the OFDM DRM system, various modulation schemes may be used, such as quadrature phase shift keying (QPSK), 16-quadrature amplitude modulation (16-QAM) and 64-QAM. The number of sub-carriers depends on the robustness mode chosen and the channel bandwidth within DRM. Currently, there are four robustness modes—A (e.g., 226 sub-carriers, 10 KHz bandwidth; 458 sub-carriers, 20 KHz bandwidth), B (206; 410 carriers), C (138; 280 carriers) and D (88; 178 carriers), which may be chosen depending propagation conditions. Bit rates ranging between 4.8 and 72 kb/s are achievable depending on the spectrum occupancy, robustness mode, modulation technique and coding rate.

Within DRM, the OFDM carrier signal constitutes the sum of a number of sub-carriers with baseband data on each sub-carrier being independently modulated using a modulation technique (e.g., QAM). The composite DRM OFDM signal is then used to modulate a main RF carrier. The benefits of using OFDM are known to those skilled in the art and, thus, need not be described further.

Spacing between the sub-carriers and the OFDM symbol length vary within DRM depending on the robustness mode. For example, the sub-carrier spacing is 41.66 Hertz in mode A and 46.88 Hertz in mode B. The OFDM symbol includes two portions—the useful portion and the guard interval. In mode A, the symbol length is 26.66 millisecond with a 24 millisecond useful portion and a 2.66 millisecond guard interval, while in mode B, the symbol length is also 26.66 millisecond but with a 21.33 millisecond useful portion and a 5.33 millisecond guard interval. The portion of the guard interval to the useful symbol's duration is different depending on the mode (A—1/9, B—1/4, C—4/11, D—11/14).

While some prior art techniques have proposed to demodulate the OFDM signal using discrete Fourier transforms (DFT), the fast Fourier transform (FFT) is typically preferred due to its reduced computational complexity. As a result, FFT processing (and inverse FFT (IFFT)) is utilized to construct and recover the OFDM composite signal in OFDM-based systems.

One specific prior art software-based DRM receiver, known as the "DREAM receiver," receives the OFDM composite signal using an intermediate frequency (IF) of 12 KHz (down-converted from the conventional 455 KHZ IF of a standard heterodyne RF front-end) and samples the signal at 48 KHz. The DREAM receiver demodulates the received DRM OFDM signal using fast Fourier transform in the West (FFTW). This is a widely used free-software library that computes the DFT and its special cases. Though competitive with vendor-optimized programs, the FFTW is not tuned to a fixed machine. Rather, FFTW uses a planner to adapt its algorithms to the hardware platform in order to increase performance.

In the PC-based DREAM receiver, the 48 KHz sampled signal is input to the FFTW blocks after determining the FFT window. All DRM robustness and spectrum occupancy modes may be sampled at this frequency without adjustments, and the DFT's point number (i.e., number of samples of the useful part of the symbol) is as follows: A mode—1152; B mode—1024, C mode—704; D mode—448. Four major algorithms are implemented in FFTW, including Cooley-Tukey, Prime-factor, Rader and Bluestein. The FFTW planner measures actual run time of different plans and selects the fastest one. FFTW may also provide a mode of operation where it quickly returns a "reasonable" plan, but this may not be the fastest. For the PC-based DREAM receiver, the FFTW may be a reasonable implementation for DRM OFDM demodulation.

When using FFT, it is generally desirable to sample the desired signal using a number of samples equal to a power of two (sometimes referred to as "points of power of 2"). However, because of the symbol guard interval length to useful symbol portion (as described above) specified in the DRM specification (see above), none of the robustness modes (except B) can achieve simultaneously points of power of 2 in the useful symbol portion and integer points in the guard interval. Therefore, FFTW as used in the DREAM receiver results in higher complexity than FFT.

Accordingly, there is needed a new DRM receiver and method that uses an FFT for demodulating DRM OFDM signals in order to reduce computational complexity. Such FFT may be implementable in hardware, such as a field programmable gate array (FPGA), application specific integrated circuit (ASIC), or digital or other signal processor (programmed accordingly).

As noted above, the DRM specification contemplates various simulcast modes because of the relative time and cost necessary to shift the current AM spectrum to the DRM-encoded digital signals. Simulcast transmission of DRM and AM signals may be performed by the juxtaposition of an analog AM channel with a DRM digital channel (e.g., channel spacing of 10 KHz between the AM carrier frequency and the digital reference frequency). Therefore, both analog (AM) and digital (DRM) signals will likely coexist for some time. In a DRM receiver capable of receiving both DRM encoded and traditional analog AM signals, a separation filter is required. Due to the proximity of the frequency bands, it is difficult and complex to design the separation filter. For example, in robustness mode A and spectrum occupancy mode 0, a filter with pass-band of 2083.33 Hertz (signals on sub-carriers #2 to #102) and transient-band 83.33 Hertz would be required (the interval between the digital signal and analog signal is 83.33 Hertz).

Using a conventional MATLAB filter design tool, and assuming desired filter parameters of 1 dB in-band ripple and 40 dB stop-band attenuation, when the sampling frequency is relatively high (100 KHz or greater), the order of the filter is in the thousands.

Accordingly, there is needed a new DRM receiver and method including a digital and analog separation filter to receive and separate conventional analog AM signals and DRM-encoded digital signals that are transmitted in close proximity within the transmission band.

SUMMARY

In accordance with one embodiment, there is provided a Digital Radio Mondiale (DRM) receiver including an analog-to-digital converter (ADC) for sampling a received composite RF signal at a first sampling rate, the composite RF signal comprising a DRM-encoded signal and a non DRM-encoded signal; and a downsampler for downsampling the received composite signal at a downsampling rate x, where x is an positive integer. A mode identifier coupled to the output of the downsampler determines a predetermined DRM parameter mode of the received DRM-encoded signal and outputs a signal indicative of the determined DRM mode. A demodulator coupled to the downsampler receives and demodulate the downsampled DRM-encoded signal into a plurality of cells. The demodulator includes a programmable N-point Fast Fourier Transform (FFT), where N is an integer number equal to a power of two, and N is determined in response to the signal indicative of the determined DRM mode.

In another embodiment, there is provided a method for demodulating a Digital Radio Mondiale (DRM)-encoded signal. A composite signal comprising a Digital Radio Mondiale (DRM)-encoded signal and a non DRM-encoded signal is received, wherein the DRM-encoded signal is encoded in accordance with a predetermined DRM parameter mode, and digitally sampled at a first sampling rate to generate composite digital signal samples. The composite digital signal samples are downsampled according to a first downsampling rate x, where x is an integer. The composite digital signal samples are filtered and separated into the DRM-encoded signal and the non DRM-encoded signal. The DRM parameter mode of the DRM-encoded signal is determined and a signal indicative of the determined DRM parameter mode is generated. The downsampled DRM-encoded digital signals are demodulated into a plurality of cells using a programmable N-point Fast Fourier Transform (FFT), where N is an integer number equal to a power of two, and N is determined in response to the signal indicative of the determined DRM parameter mode.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1 is a block diagram of a DRM receiver according to this disclosure; and

FIG. 2 is a detailed diagram of the processing system shown in FIG. 1.

DETAILED DESCRIPTION

FIG. 1 illustrates block diagram of a receiver system 100 operable for receiving DRM encoded signals and other analog signals within a given frequency range (low, medium and high frequency). Other embodiments of the receiver 100 may be used without departing from the scope of this disclosure.

Prior to describing in further detail the receiver 100, a description of the basic function and operation of a typical DRM transmitter and DRM encoding shall be provided. The term "DRM-encoded signal" shall be used herein to describe a signal encoded in accordance with the DRM system specification described in ETSI ES 201 980 Version 2.2.1 (2005-10) (including any past or future variants or versions), and which is incorporated herein by reference.

A DRM-encoded signal includes at least three distinct channels grouped into a DRM superframe. These channels are known as the (1) Fast Access Channel (FAC), (2) Service Description Channel (SDC) and (3) Main Service Channel (MSC). The FAC provides information enabling a receiver to decode the SDC and MSC. The SDC provides additional information about channels, extra services and additional DRM features. The MSC delivers the actual content that may be included in up to four streams containing audio or data. The DRM transmitter may choose between different configurations for the SDC and MSC depending on different conditions of the radio transmission channel and error protection requirements.

The DRM audio and data are typically combined into the MSC after the audio data is encoded in accordance with a desired audio encoder (e.g., MPEG-4 audio standard). The MSC is then encoded using a multi-level coding (MLC) scheme based on parameters for bit interleaving, convolutional encoding and energy dispersal (the parameters depend on the desired error protection level). This bit stream is then encoded with a modulation scheme, such as QAM (e.g., 4, 16 or 64). The DRM FAC and SDC are similarly encoded using MLC and a Modulation scheme (same or different for each channel).

The encoded and modulated information in the MSC, FAC and SDC are combined with reference pilot cells (which allow for receiver synchronization and channel estimation) to create the OFDM symbols which are input to an inverse Fast Fourier Transform (IFFT). A guard interval/signal is added to each symbol in accordance with the DRM specification to generate the DRM-encoded OFDM composite signal. This signal is then transmitted on a carrier frequency. In one possible implementation, the output of the IFFT may include complex I and Q signals, with the I/Q signals transmitted as I/Q over the carrier signal. Other transmitter/transmission configurations and methods may be utilized, as may be known to those of ordinary skill in the art.

Now turning to FIG. 1, there is illustrated a block diagram of the receiver 100 in accordance with one embodiment of the present invention. The receiver 100 includes an antenna 102 for receiving a radio frequency (RF) DRM-encoded signal and other RF signals (non DRM-encoded signals) over a predetermined frequency band. The "other RF signals" may include any RF signal within the predetermined frequency band, which may range up to 30 MHZ, or 85 MHz, and perhaps even higher, and may range down to about 100 KHz. These other RF signals may be modulated using AM, FM or other modulation schemes. In one specific embodiment, the other RF signals are AM or FM signals.

A receiver front-end 104 receives the DRM-encoded RF signal, performs downconversion, and generates and outputs an intermediate frequency (IF) signal (e.g., 455/465 KHz) in accordance with known techniques and circuitry. Alternatively, the receiver front-end 104 may further downconvert to the baseband. The output signal (whether IF or baseband) is sampled and digitized using an analog-to-digital converter (ADC) 106 at a predetermined sampling rate. It has been determined that a sampling frequency of 384 KHz times n, where n is a positive integer, provides distinct advantages for the receiver 100, as will be described more fully herein. In one specific embodiment of the receiver 100, the ADC operates at a sampling frequency of 384 KHz.

In another embodiment, the sampling frequency is 1.536 MHz (384 KHz×4). Use of this sampling rate provides an easier implementation of the IQ demodulator, where the IQ demodulator is 4 times IF frequency. Utilization of a cordic can be used to realize remaining frequency offset downconvert (e.g., when IF s 455 KHz and sampling is at 1.536 MHz, after 4 times IF based process, the remaining frequency offset is 455 minus 1536/4=71 KHz, then using cordic to correct the 71 KHz offset frequency offset between transmitter and receiver can be corrected also). It should be understood that 384*n KHz sampling frequency may be selected if a different IQ demodulation design or scheme is utilized.

It will also be understood that the DRM signals may be modulated onto the RF carrier using any known modulation scheme, however, in one embodiment the RF signal is an IQ modulated RF signal. In the embodiment shown in FIG. 2, the received RF signal is a quadrature-mixed RF signal comprising complex I and Q signals (IQ modulation) therein, and the receiver front-end 104 downconverts the RF signal to generate and output the IF signal. Thus, in this embodiment, IQ demodulation occurs after the IF signal is digitized. Alternatively, the IQ demodulation (or other RF demodulation technique, if done) may be accomplished prior to digitization by the ADC 104.

As shown, the digitized IF signal (in the form of digital samples) generated by the ADC 106 is received by a signal processing system 108 which, in one embodiment, demodulates the digitized IF signal into a complex signal (I and Q digital signals), implements IF to baseband transformation (which may include mixing/DDC), and further processes the digital baseband signal (a DRM-encoded digital signal) to extract the encoded data (within the pilot cells, FAC, SDC and MSC channels). As will be appreciated, the DRM encoded digital signal may be processed as a complex signal at one or more points along the path, or as a real signal, as desired. The processing system 108 performs various functions, including IQ demodulation, IF to baseband transformation, time and symbol synchronization, resampling, filtering, OFDM demodulation using FFT, carrier frequency and clock frequency offset corrections, channel equalization, and data extraction and decoding (MSC, FAC, SDC; and ultimately audio data and other data to generate the digital output signals (service, data, audio data).

The processing system 108 may be implemented using hardware, or hardware in combination with software (and/or firmware). In one embodiment, the processing system 108 includes a processor or other hardware devices (not shown) executing firmware/software instructions (firmware/software) to perform the identified processing or function. Additionally, any of the specific blocks or functions shown in FIG. 2 or described herein may be implemented using software, hardware or combination thereof.

In another embodiment, the processing system 108 also includes an analog and digital (A&D) signal separation filter to filter DRM-encoded signals from other RF signals (non DRM-encoded signals, such as AM or FM signals) and outputting a second audio signal (either in a digital format or analog format). As will be appreciated, when referring to an A&D separation filter, the term "analog" refers to a traditional analog received signal (non DRM-encoded) within the desired frequency band (e.g., AM, FM), even though the "analog" signal may be digitized and thereafter processed in a digital form within the receiver 100.

It has been determined that a sampling frequency of 384 KHz times n, where n is a positive integer, provides distinct advantages for the receiver 100, as will be described more fully herein. In one embodiment of the receiver 100, the ADC 202 operates at a sampling frequency of 1.536 MHz (384 KHz×4), and in another different embodiment, the sampling frequency is 384 KHz. It will be understood that utilizing an ADC sampling frequency that is 384*n KHz is advantageous.

Now turning to FIG. 2, there is shown a detailed diagram of the processing system 108 in accordance with one embodiment. The processing system includes an IQ demodulator block 200 receiving a digitized IF signal from the ADC 106. The IQ demodulator 200 demodulates the received signal at a desired frequency (or within a desired frequency range) and generates and outputs a corresponding DRM baseband signal (in the form of separate complex I and Q signals). This generally shifts the center frequency of the received DRM spectrum to zero (or near zero).

With the DRM signal at baseband, a symbol synchronization block 204 processes the DRM baseband signal and determines the start of a new OFDM symbol which enables synchronization. This process may be accomplished according to any known techniques, such as correlation with a time-delayed version of the input. After synchronization, the digital DRM signal samples (synchronized into OFDM symbols) are input to a programmable downsampler 206 (also known as a resampler, downconverter, or decimator). The downsampler 206 downsamples or reduces the number of digital signal samples by a predetermined factor x (e.g., for x=12, every 12th sample is used and the others are discarded). This effectively reduces the sampling rate, and hence the number of samples, or downsampling (resampling) rate, of the digital signal samples input to the downsampler 206 by the factor x. For example, if the rate of the digital signal samples input to the downsampler 206 is 384 Ksamples/second (384 KHz) and the downsampling rate is 36 (x=36), the output will equal 10.667 Ksamples/second.

It will be understood that the downsampler 206 additionally may support minor fraction times downsampling (e.g., 16.0001) enabling correction of clock frequency offset at this point also.

The downsampling rate is programmable and selected in response to, or based on, one or more DRM transmission or encoding parameters (e.g., OFDM parameters) or modes utilized in generating the encoded DRM signal. These parameters/modes include robustness and spectrum occupancy. The DRM mode is based on which robustness mode or spectrum occupancy mode (or combination thereof) is utilized. Upon identifying the applicable DRM mode of the received DRM-encoded signal, the robustness and/or spectrum occupancy modes determine or effectively select or program (control) the downsampling rate.

The downsampled digital signal samples output from the downsampler 206 are received at an analog and digital (A&D) separation filter 208. The A&D separation filter 208 filters and separates the desired DRM-encoded signal from other desired signals within the given channel or bandwidth. For example, in a simulcast mode the received signal comprises both a DRM signal and a juxtapositioned broadcast signal (e.g., AM, FM) within a given channel or bandwidth. Recovery of both signals is desired. The filter 208 differentiates or separates these two signals for further processing. This will be described more fully below. If reception of the conventionally broadcast second signal is undesirable or unneeded, the A&D separation filter 208 may be omitted.

The filtered (or unfiltered) digital signal samples output from the A&D separation filter 208 are input to an OFDM demodulation block 210. The OFDM demodulator 210 demodulates the OFDM signals using a programmable N-point FFT 211 having a power of two (where N equals a power of two, with the power being a positive integer. In one embodiment, the FFT 211 is programmable such that N=128, 256 or 512. The FFT 211 may be implemented in hardware, software or combination thereof, and in one embodiment, the FFT is realized using embedded C software executing within a processor, such as a digital signal processor or other processor (e.g., ARM processor). The OFDM demodulator 210 processes the digital signal samples and recovers the individual cells in the OFDM symbol.

Similar to the programmable downsampler 206, the number N of points (or point size) of the FFT 211 is programmable and selected in response to, or based on, one or more DRM transmission or encoding parameters (e.g., OFDM parameters) or modes utilized in generating the encoded DRM signal. These parameters/modes include robustness and spectrum occupancy. Upon identifying the applicable DRM mode of the received DRM-encoded signal, the robustness and/or spectrum occupancy modes determine or effectively select or program (control) the number N of points.

The filtered (or unfiltered) digital signal samples output from the A&D separation filter 208 are also input to a mode identifier block 212. The mode identifier 212 examines the DRM-encoded signal and determines the signal's DRM mode (robustness and/or spectrum occupancy parameters). Based on this, the mode identifier 212 sends a control signal to the downsampler 206 that controls or programs its downsampling rate based on the determined robustness and/or spectrum occupancy modes. Similarly, the output from the mode identifier 210 controls or programs the N number of points of the FFT 211 within the OFDM demodulator 212. Further, the A&D separation filter 210 also receives this output and is used to adjust or modify (or program) the filter parameters based on the determined spectrum occupancy mode.

It should be understood that initially, when DRM robustness mode has not yet been determined, the FFT is not executed (and thus the FFT point is irrelevant). The default modes used by the mode identifier 212 are robustness mode B and spectrum occupancy mode 0. This occurs because at the beginning of the DRM received signal, only the FAC channel is at [0.5 KHz].

The output of the OFDM modulator 212 is input to a carrier frequency offset estimation block 214, a time synchronization block 216 and a clock frequency offset estimation block 218. The carrier frequency offset estimator block 214 is used to estimate the frequency offset between carrier of transmission and local oscillator. This may be done by using the DRM signal's frequency pilots to estimate offset. The offset output of the carrier frequency offset estimator 214 is input to the IQ demodulator 202 and used to adjust the frequency downconvert process. The time synchronizer 216 is used to estimate time(phase) offset between transmitter and receiver, and its output is input to the symbol synchronizer 204 to adjust the phase of the successive DRM-encoded signal. This may be done using the DRM signal's gain pilots to estimate time offset. The clock frequency offset estimator 218 is used to estimate the clock frequency offset between transmitter and receiver, and its output is input to the downsampler 206 to adjust the local oscillator. The clock frequency is corrected in the digital domain (which uses a, NCO and interpolator to correct the clock frequency of DRM signal).

The output of the OFDM modulator 212 is also input to an equalization block 220 which estimates channel transfer function using the known transmitted gain pilot pattern. The OFDM cells are then corrected with the inverse of the estimated channel transfer function.

After equalization, the DRM signal is decoded by the DRM decoder 222. The decoder 222 determines the start of the DRM frame using DRM's time pilots or gain pilots to determine the beginning point (i.e., which one is the first symbol of the transmission frame) of the transmission frame and separates the cells into the three information channels—MSC, SDC and FAC. The FAC provides information enabling the decoder 222 to decode the SDC and MSC. The SDC provides additional information about channels, extra services and additional DRM features. The MSC delivers the actual content that may be included in up to four streams containing digital audio or data. An audio decoder (not shown) decodes the digital audio for further processing by the receiver 200.

The present disclosure describes a DRM receiver and OFDM demodulation scheme that utilizes FFT to demodulate the OFDM signal using a programmable N-point FFT, where the N depends on the DRM mode. In one embodiment, a first sampling rate is selected to ensure in an OFDM symbol, there are $N_u = x \cdot 2^m$ sample points in the useful part of the OFDM symbol and $N_g = y$ sample points in the guard interval, where x and y are all integer. And then a second sampling rate or frequency is chosen such that the FFT may be implemented with N points, where $N = 2^m$ is equal to a power of 2 in the useful part of the OFDM symbol. This results in a fraction of a sample y/x−floor (y/x) in the OFDM symbol guard interval. The fractional sample may be ignored without any appreciable influence or affect on OFDM demodulation because only the useful part of the symbol is utilized in demodulation.

It has been determined that integer times of 1/T (12 kHz) should be used as the sampling frequency to ensure there are integer number of samples in the useful part of the OFDM symbol. Furthermore, in order to utilize a reduced number of power of two points FFT 211 to demodulate the OFDM signal, and understanding that there exist different DRM modes (e.g. robust and spectrum occupancy modes), it is determined that a lowest common multiple of the required sampling frequencies for the different modes translates to a lowest sampling frequency of 384 KHz which simplifies the design and reduces the computational complexities of the DRM receiver 100. As will be appreciated, sampling may be done at an integer times multiple of 384 KHz sampling rate.

Sub-carrier numbers and minimum point number of FFT in OFDM demodulation of each DRM mode are listed below in Table I:

TABLE I

| Robustness mode | Spectrum Occupancy | | | | | |
|---|---|---|---|---|---|---|
| | 0 | 1 | 2 | 3 | 4 | 5 |
| A | 101(128) | 113(128) | 205(256) | 229(256) | 413(512) | 461(512) |
| B | 91(128) | 103(128) | 183(256) | 207(256) | 367(512) | 411(512) |
| C | \ | \ | \ | 139(256) | \ | 281(512) |
| D | \ | \ | \ | 89(128) | \ | 179(256) |

Based on the desired number of samples for use in the N-point FFT in the useful part of the OFDM symbol, the downsampling rate (assuming the base sampling rate is 384 KHz) are listed in Table II, where A, B, C and D are the robustness modes, and x is the spectrum occupancy mode:

TABLE II

| x | A | B | C | D |
|---|---|---|---|---|
| 0 | 72 | 64 | \ | \ |
| 1 | 72 | 64 | \ | \ |
| 2 | 36 | 32 | \ | \ |
| 3 | 36 | 32 | 22 | 28 |
| 4 | 18 | 16 | \ | \ |
| 5 | 18 | 16 | 11 | 14 |

If the digital sampling rate of the received DRM-encoded RF signal is 384*n KHz, the downsample rate x will be adjusted to x=x*n, assuming no intervening downsampling occurs between the ADC 104 and the downsampler 206. If intermediate downsampling (integer) occurs, then the sampling rate x should be adjusted accordingly. One aspect of the disclosure provides that the received DRM signal be initially sampled at a rate of 384*n KHz, where n is an integer, and the downsampling produces a number of samples (in one OFDM symbol) input to the FFT that is equal to a number N determined by the DRM parameter transmission mode as shown in Table I, where N is equal to a power of 2. The downsampler 206 may comprise a single downsampler, multiple downsamplers and/or be configured from or include one or more downsamplers provided as a portion of another element along the received signal path. However the downsampler 206 is implemented, the downsampling rate x generally equals an integer number that effectively downsamples or reduces the number of digital samples generated at the sampling rate of the ADC 104 to a number of samples (in the received OFDM symbol) is equal to N.

It will be understood that the DRM receiver 100 may include components or functions in addition to those shown and described, however, only components and functions necessary for an understanding of this disclosure by those skilled in the art have been described and shown.

The general operation of the DRM receiver 100 will now be described. A DRM-encoded RF signal is received and digitized (ADC) at a sampling rate equal to an integer multiple of 384 KHz. The received DRM-encoded signal is examined to determine the DRM mode of transmission, including the robustness mode (A, B, C, D) and spectrum occupancy mode (0 through 6). Depending on these determined mode(s), the digital signal samples are downsampled by a predetermined factor according to the determined DRM mode (see Table II), and the downsampled DRM-encoded signal samples are input to an N-point power of two FFT for demodulation. The FFT is programmed as an FFT having N points, where the number N is based on the determined mode(s) (see Table I).

Again turning to FIG. 2, the A&D separation filter 208 outputs a second signal (Signal 2) corresponding to the second conventional broadcast signal (e.g., AM, FM) and is processed conventionally as desired (not shown) (such as converting to analog format and outputting the audio signal to an audio speaker).

Though the ultimate goal of the DRM system is digitalization of the AM, FM broadcasts, before this will be achieved, the DRM signals need to coexist. Because the DRM signals are designed to work in the same broadcast bands as AM and FM (non DRM-encoded RF signal), simulcast (or multicast) transmission of data and services using DRM and AM/FM is performed by the juxtaposition of the analog AM/FM signal and DRM digital signal. Additional details may be found in ETSI ES 201 980 Version 2.2.1. As a result, a DRM receiver 100 may also receive a non DRM-encoded signal present within the channel bandwidth (i.e., a composite signal). The A&D separation filter 208 filters and processes the composite signal and separates these two signals. However, since these adjacent signals are close within the frequency spectrum, it is generally difficult to design the filter. For example, in robustness mode A and spectrum occupancy mode 0, the interval between digital and analog signal is only 41 2/3×2+250/3 Hz, so the filter design is complex.

To decrease the design complexity of the A&D separation filter 208, low sampling frequency is desired. The present receiver 100 design (e.g., with programmable downsampler 206 and programmable FFT 211) enables for a relatively simpler filter design with a reasonable filter order.

Because a 384 kHz sampling base frequency, as described herein, would result in a relatively high filter order, the downsampling of the digital samples in the signal path prior to the A&D separation filter 208, in addition to the benefits described above, enables a filter having a lower order. Using the example in which the DRM signal has robustness mode A and spectrum occupancy mode 0, the down-sample rate is 72 (384 KHz/72), the useful portion of the OFDM symbol has a point number of 128. The analog and digital separation filter design at this sampling frequency (384 kHz/72) is comparatively simpler. With in-band ripple 1 dB and stop-band attenuation of 40 dB, as with the example described previously, the order of the separation filter should be ninety-one (instead of thousands).

The actual configuration of the A&D separation filter 208 is not described herein, as a person of ordinary skill in the art will understand and recognize the specific implementation may be different depending on the design methods and parameters desired or utilized.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller or function may be implemented in or by hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A Digital Radio Mondiale (DRM) receiver comprising:
   an analog-to-digital converter (ADC) configured to sample a received composite RF signal at a first sampling rate, the composite RF signal comprising a DRM-encoded signal and a non DRM-encoded signal;
   a downsampler configured to downsample the received composite signal at a downsampling rate x, where x equals the first sampling rate divided by a positive integer greater than 1;
   an analog and digital separation filter configured to receive the downsampled composite signal and separate the DRM-encoded signal from the non DRM-encoded signal;
   a mode identifier coupled to the output of the downsampler and configured to determine a predetermined DRM parameter mode of the received DRM-encoded signal and output a signal indicative of the determined DRM mode; and
   a demodulator coupled to the downsampler and configured to receive and demodulate the downsampled DRM-encoded signal into a plurality of cells, the demodulator further comprising a programmable N-point Fast Fourier Transform (FFT), where N is an integer number equal to a power of two, and N is determined in response to the signal indicative of the determined DRM mode.

2. The receiver in accordance with claim 1, wherein the first sampling rate is an integer multiple of 384 KHz.

3. The receiver in accordance with claim 1, wherein N is a one of 128, 256 and 512.

4. The receiver in accordance with claim 1, wherein the DRM parameter mode is dependent on a robustness mode and a spectrum occupancy mode.

5. The receiver in accordance with claim 1, wherein the downsampling rate x is programmable and depends on the DRM mode.

6. The receiver in accordance with claim 1, wherein the downsampling rate x equals an integer number such that when the first sampling rate is divided by the downsampling rate x, the result equals an integer number N of samples from a useful portion of one OFDM symbol, and wherein N is an integer equal to a power of two.

7. The receiver in accordance with claim 6, wherein N is a one of 128, 256 and 512.

8. The receiver in accordance with claim 7, wherein N depends on a robustness mode and a spectrum occupancy mode as defined in a DRM specification, such that N is equal to 128 when the robustness mode equals A or B and the spectrum occupancy mode equals 0 or 1, N is equal to 256 when the robustness mode equals A or B and the spectrum occupancy mode equals 2 or 3, and N is equal to 512 when the robustness mode equals A or B and the spectrum occupancy mode equals 4 or 5.

9. The receiver in accordance with claim 1, further comprising:
   a decoder configured to decode and separate the cells into a fast access channel (FAC), a service description channel (SDC) and a main service channel (MSC), and wherein the MSC comprises audio data.

10. The receiver in accordance with claim 1, wherein the analog and digital separation filter has a filter order less than 100.

11. A method for demodulating composite RF signal including a Digital Radio Mondiale (DRM)-encoded signal and a non DRM-encoded signal, the method comprising:
   receiving a composite signal comprising a Digital Radio Mondiale (DRM)-encoded signal and a non DRM-encoded signal, and wherein the DRM-encoded signal is encoded in accordance with a predetermined DRM parameter mode;
   digitally sampling the composite signal at a first sampling rate to generate composite digital signal samples;
   downsampling the composite digital signal samples according to a first downsampling rate x, where x equals the first sampling rate divided by a positive integer greater than 1;
   filtering the downsampled composite digital signal samples and separating the DRM-encoded signal and the non DRM-encoded signal;
   determining the DRM parameter mode of the DRM-encoded signal and generating a signal indicative of the determined DRM parameter mode; and
   demodulating the downsampled DRM-encoded digital signals into a plurality of cells using a programmable N-point Fast Fourier Transform (FFT), where N is an integer number equal to a power of two, and N is determined in response to the signal indicative of the determined DRM parameter mode.

12. The method in accordance with claim 11, further comprising sampling at a rate that is an integer multiple of 384 KHz.

13. The method in accordance with claim 11, wherein N is a one of 128, 256 and 512.

14. The receiver in accordance with claim 11, wherein the determined DRM parameter mode is dependent on a robustness mode and a spectrum occupancy mode.

15. The receiver in accordance with claim 11, wherein the downsampling rate x is variable and depends on the determined DRM parameter mode.

16. The method in accordance with claim 11, wherein the downsampling rate x equals an integer number such that when the first sampling rate is divided by the downsampling rate x, the result equals an integer number N of samples from a useful portion of one OFDM symbol, and wherein N is an integer equal to a power of two.

17. The method in accordance with claim 16, wherein N is a one of 128, 256 and 512.

18. The method in accordance with claim 17, wherein N depends on a robustness mode and a spectrum occupancy mode as defined in a DRM specification, such that N is equal to 128 when the robustness mode equals A or B and the spectrum occupancy mode equals 0 or 1, N is equal to 256 when the robustness mode equals A or B and the spectrum occupancy mode equals 2 or 3, and N is equal to 512 when the robustness mode equals A or B and the spectrum occupancy mode equals 4 or 5.

19. The method in accordance with claim 11, further comprising:
    decoding and separating the cells into a fast access channel (FAC), a service description channel (SDC) and a main service channel (MSC), wherein the MSC comprises audio data.

20. The method in accordance with claim 11 wherein filtering the downsampled composite digital signal samples is performed using a filter having an order less than 100.

* * * * *